US008388036B2

(12) United States Patent
Townsend

(10) Patent No.: US 8,388,036 B2
(45) Date of Patent: Mar. 5, 2013

(54) RETRO-FIT LIFT DEVICE FOR REFUSE COLLECTION VEHICLE

(76) Inventor: John Townsend, Pittsburgh, PA (US)

( * ) Notice: Subject to any disclaimer, the term of this patent is extended or adjusted under 35 U.S.C. 154(b) by 58 days.

(21) Appl. No.: 12/808,271

(22) PCT Filed: Dec. 17, 2008

(86) PCT No.: PCT/US2008/087187

§ 371 (c)(1),
(2), (4) Date: Sep. 20, 2010

(87) PCT Pub. No.: WO2009/079563

PCT Pub. Date: Jun. 25, 2009

(65) Prior Publication Data

US 2011/0001327 A1 Jan. 6, 2011

Related U.S. Application Data

(60) Provisional application No. 61/007,889, filed on Dec. 17, 2007.

(51) Int. Cl.
*B25J 15/04* (2006.01)
*B65F 3/02* (2006.01)

(52) U.S. Cl. ......................... 294/197; 294/207; 414/607

(58) Field of Classification Search ............... 294/81.54, 294/81.62, 68.27, 197, 207, 103.1, 81.26; 414/406, 408, 421, 607
See application file for complete search history.

(56) References Cited

U.S. PATENT DOCUMENTS

| | | | | | |
|---|---|---|---|---|---|
| 3,578,373 | A | * | 5/1971 | Metz | 294/82.3 |
| 3,874,534 | A | | 4/1975 | Brisson | |
| 4,091,944 | A | | 5/1978 | Gollnick | |
| 5,266,000 | A | * | 11/1993 | LeBlanc, Jr. | 414/408 |
| 5,580,113 | A | * | 12/1996 | Pomerville et al. | 294/82.35 |
| 5,826,485 | A | | 10/1998 | Bayne et al. | |
| 6,027,299 | A | * | 2/2000 | Williams | 414/408 |
| 6,224,317 | B1 | * | 5/2001 | Kann et al. | 414/408 |
| 6,588,815 | B1 | * | 7/2003 | Paradise et al. | 294/197 |
| 2005/0111942 | A1 | * | 5/2005 | Rimsa et al. | 414/408 |

* cited by examiner

*Primary Examiner* — Dean Kramer
(74) *Attorney, Agent, or Firm* — The Webb Law Firm

(57) ABSTRACT

A retro-fit lift device for a front load refuse collection vehicle including a base having a rear surface, a trunnion receiving portion defining a channel, and a pin member movable between an extended position and a retracted position. The rear surface of the base is configured to receive a cross-beam of the front load refuse collection vehicle. The trunnion receiving portion is connected to the base member. At least a portion of the pin member extends into the channel in the extended position. A method of picking up a rear load collection container having a trunnion with a front load refuse collection vehicle is also disclosed.

19 Claims, 12 Drawing Sheets

RETRO-FIT LIFT DEVICE FOR REFUSE COLLECTION VEHICLE

BACKGROUND OF THE INVENTION

1. Field of the Invention

This invention relates to refuse collection vehicles, and more particularly to a retro-fit device for allowing a front load refuse collection vehicle to dump refuse from rear loading containers as well as front loading containers.

2. Description of Related Art

There are generally two types of refuse containers used in commercial refuse collection: rear load containers having a trunnion or bar portion located on the top of the container, and front load containers having a set of pockets located on the sides of the container.

Typically, the rear load containers can only be picked up and emptied using a rear load refuse collection vehicle. The rear load collection vehicle has a rear portion with a clamping arm to engage the trunnion on the rear load container. A cable is used to hoist the rear load container off the ground, pivoting the rear load container about the trunnion to empty the container's contents into the rear of the collection vehicle. Other rear load collection vehicles utilize a hydraulically actuated kick bar to engage a lower part of the container thereby lifting and pivoting the container about the trunnion to empty the rear load container.

The front load containers can generally only be picked up and emptied using a front load refuse collection vehicle. The front end collection vehicle has a front portion with a hydraulically actuated lifting apparatus. The lifting apparatus includes a pair of forks spaced apart from one another which engage the pockets located on the sides of the front load container. To empty a front load container, the forks on the front load collection vehicle are driven through the pockets of the front load container. The lifting apparatus is actuated to lift and turn the front load container upside down thereby emptying the contents of the container into the collection vehicle via an opening on the top of the vehicle.

Since the front and rear load containers can generally only be emptied with the front and rear load collection vehicles, respectively, refuse collection companies utilize both front load and rear load collection vehicles when servicing their customers. Utilizing both types of collections vehicles, however, often causes inefficiencies in servicing particular collection routes. For instance, a first business may use a rear load container and a second business located nearby may use a front load container. Therefore, the collection company would need to send a rear load collection vehicle to the first business and a front load collection vehicle to the second business, even though both businesses are close in proximity. Replacing the rear load containers with front load containers or modifying the containers to allow them to be picked up by either a front load or rear load collection vehicle is inefficient and expensive given the large number of containers that would need to be replaced or modified.

SUMMARY OF THE INVENTION

In one embodiment, a retro-fit lift device for a front load refuse collection vehicle is provided. The retro-fit lift device includes a base having a rear surface, a trunnion receiving portion defining a channel, and a pin member movable between an extended position and a retracted position. The rear surface of the base is configured to receive a cross-beam of the front load refuse collection vehicle. The trunnion receiving portion is connected to the base member. At least a portion of the pin member extends into the channel in the extended position. The channel may be configured to receive a trunnion of a rear load collection container when the pin member is in the retracted position.

In certain embodiments, the trunnion receiving portion comprises a plurality of C-shaped brackets secured to the base member. Each of the C-shaped brackets have an upper extending portion, a lower base portion, and an intermediate portion. The retro-fit lift device may further include a top plate secured to the upper extending portion of each C-shaped bracket, a back plate secured to the intermediate portion of each C-shaped bracket, and a mounting plate secured to the lower base portion of each C-shaped bracket. The channel may extend between the top plate and the mounting plate and the pin member may be removed from the channel in the retracted position. Further, the top plate may have an angled forwardly extending portion.

In one embodiment, the base comprises a C-shaped channel member and the rear surface of the base is an open portion of the C-shaped channel member. The retro-fit lift device may further include a wear plate connected to a front surface of the base member. The wear plate may be constructed of a polymeric material and may have an angled front surface. The pin member may be selectively actuated from the retracted position to the extended position via a cylinder device. The cylinder device may be a pneumatically actuated cylinder. Further, the pneumatically actuated cylinder may be at least partially enclosed by a guard. The pneumatically actuated air cylinder may be connected to the guard with the guard being secured to a front surface of the base.

In a further embodiment, a method of picking up a rear load collection container having a trunnion with a front load refuse collection vehicle is provided. The method of picking up the rear load collection container includes the step of providing at least one retrofit lift device on a cross-beam of the front load refuse collection vehicle. Each retro-fit lift device includes a base having a rear surface, a trunnion receiving portion defining a channel, and a pin member movable between an extended position and a retracted position. The rear surface of the base is configured to receive the cross-beam of the front load refuse collection vehicle and the trunnion receiving portion is connected to the base member. The method further includes the steps of moving the pin member into the retracted position and then moving the trunnion receiving portion such that the trunnion of the rear load collection container is positioned within the channel. Further, the method includes the step of moving the pin member into the extended position thereby securing the trunnion within the channel.

In one embodiment, the method includes the step of lifting the rear load collection container by moving the cross-member of the front load collection vehicle upwardly. The pin member may be actuated from the retracted position to the extended position via a pneumatically actuated air cylinder. The retro-fit lift device may include a wear plate connected to a front surface of the base member and the method may further include the step of engaging the rear load collection container with the wear plate.

DESCRIPTION OF THE PREFERRED EMBODIMENTS

Figure 1:
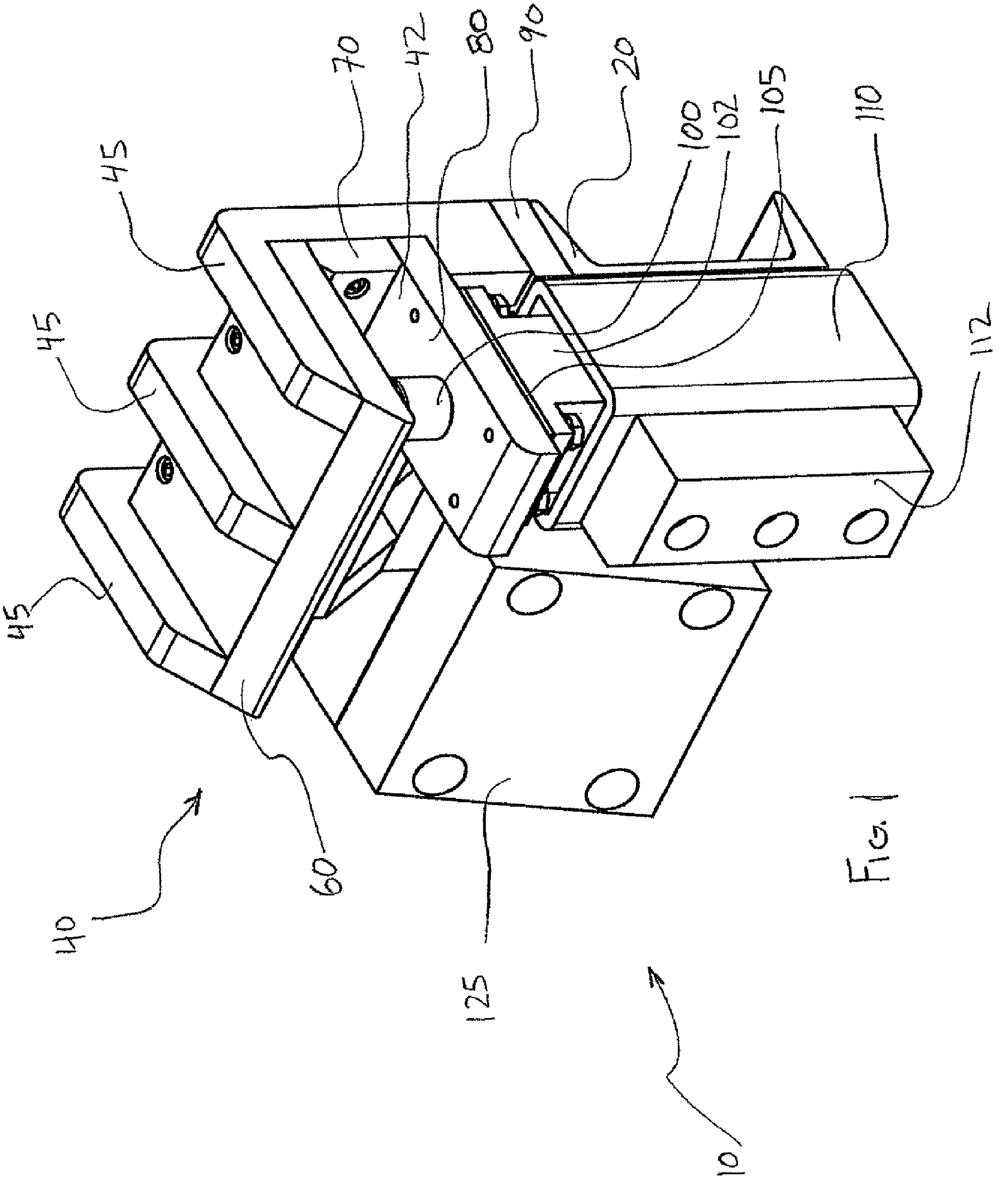
FIG. 1 is a perspective view of a retro-fit lift device according to one embodiment.

The present invention will now be described with reference to the accompanying figures. For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is to be understood that the specific apparatus illustrated in the attached figures and described in the following specification is simply an exemplary embodiment of the present invention. Hence, specific dimensions and other physical characteristics related to the embodiments disclosed herein are not to be considered as limiting.

Referring to FIGS. 1-4, one embodiment of a retro-fit lift device 10 for a front load refuse collection vehicle includes a base 20, a trunnion receiving portion 40 defining a channel 42, a bottom plate 90, a pin member 100, a cylinder device 102, a spacer 105, a guard 110, an angle member 120, and a wear plate 125. The trunnion receiving portion 40 includes a plurality of C-shaped brackets 45, a top plate 60, a back plate 70, and a mounting plate 80.

Figure 9:
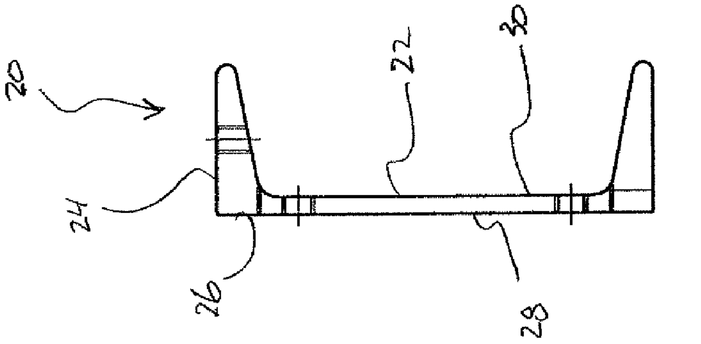
FIG. 9 is a side view of the base shown in FIG. 7.
Figure 7:
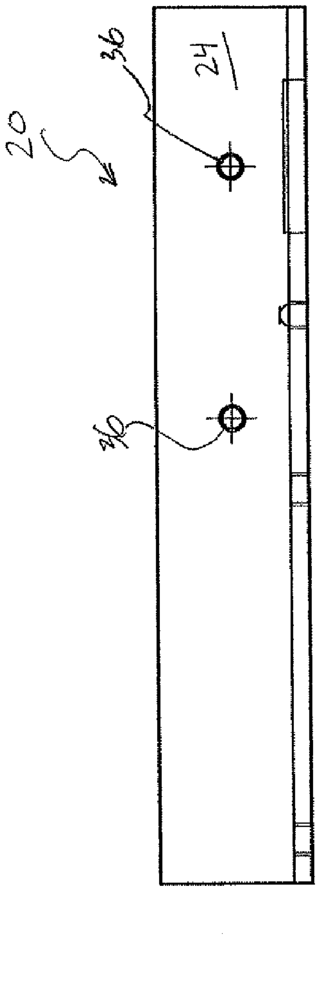
FIG. 7 is a top view of a base according to one embodiment.
Figure 8:
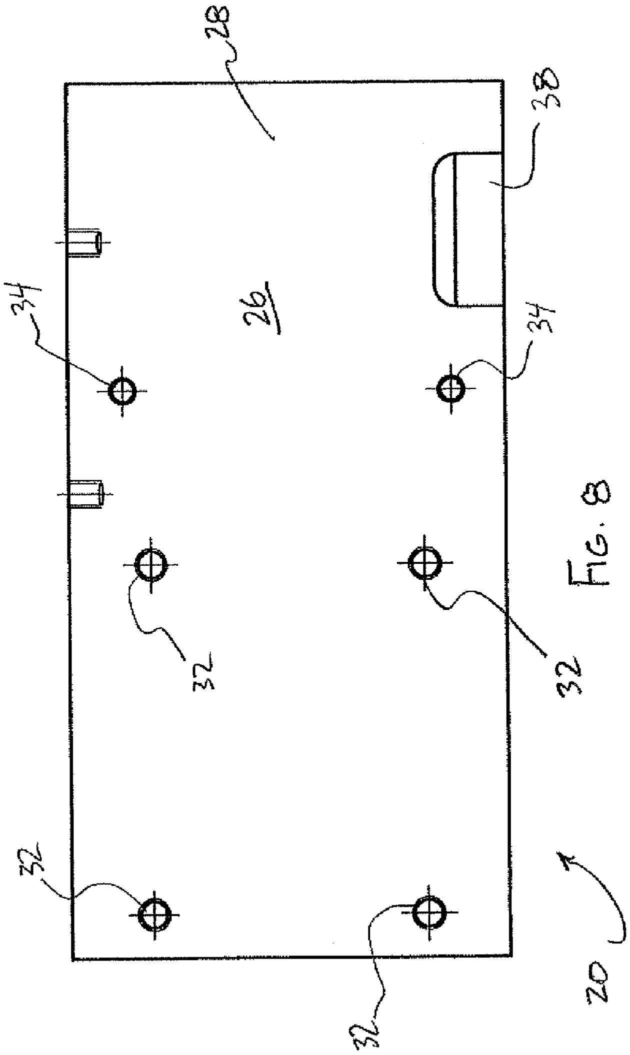
FIG. 8 is a front view of the base shown in FIG. 7.

Referring to FIGS. 7-9, the base 20 is an elongate C-shaped channel member having a rear surface 22, a top surface 24, and a front surface 26. The base 20 has a closed side 28 and an open side 30. The base 20 includes four openings 32 for securing the wear plate 125 to the front surface 26 of the base 20. The base 20 also includes two holes for securing the angle member 120 and two holes 36 for securing the bottom plate 90 to the top surface 24 of the base 20. The base 20 may be constructed of steel although any other suitable material may used.

Figure 12:
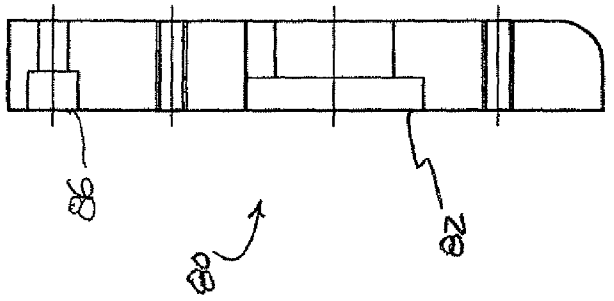
FIG. 12 is a side view of the mounting plate shown in FIG. 10.
Figure 10:
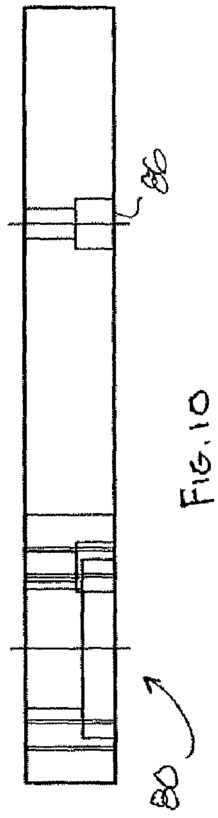
FIG. 10 is a front view of a mounting plate according to one embodiment.
Figure 11:
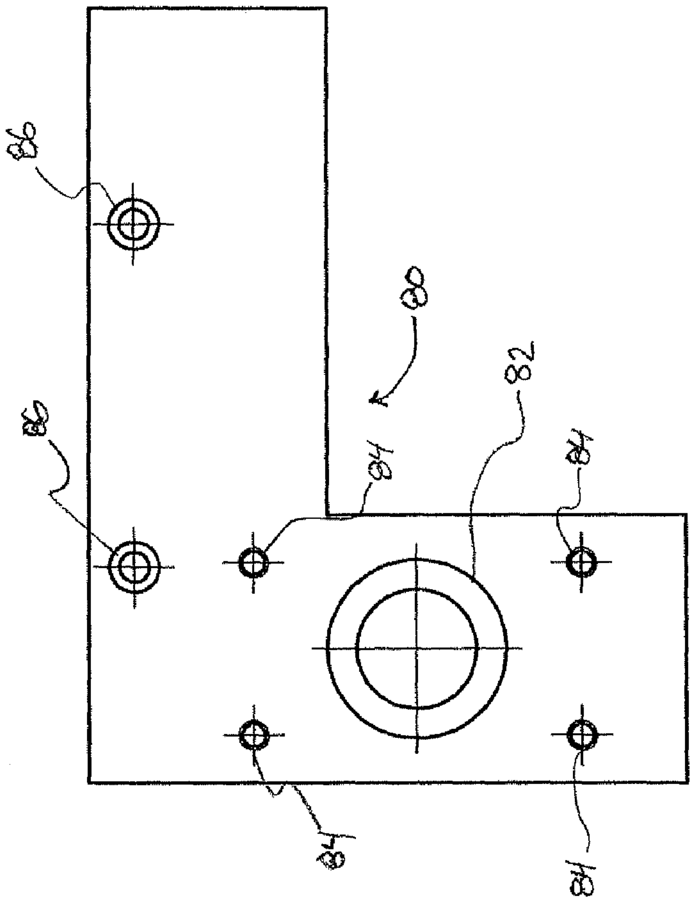
FIG. 11 is a top view of the mounting plate shown in FIG. 10.

Referring to FIGS. 10-12, the mounting plate 80 is an L-shaped plate member having a cylinder collar receiving bore 82, openings 84 for attaching the cylinder device 102 to the mounting plate 80, and openings 86 for attaching the mounting plate 80 to the back plate 70. The mounting plate 80 may be constructed of steel although any other suitable material may be used.

Figure 15:
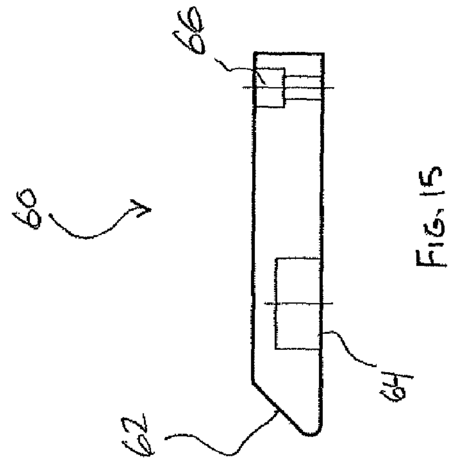
FIG. 15 is a side view of the top plate shown in FIG. 13.
Figure 13:
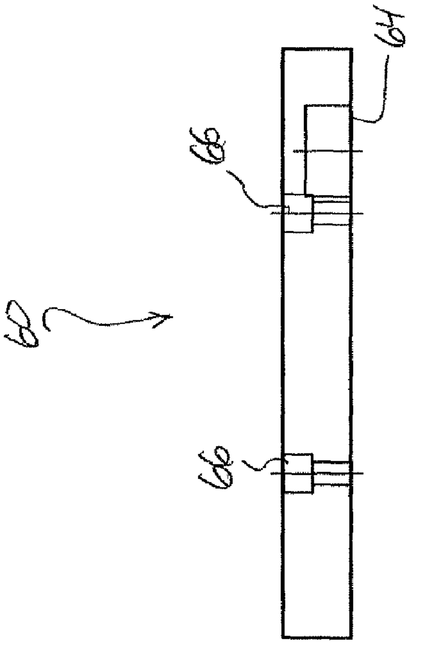
FIG. 13 is front view of a top plate according to one embodiment.
Figure 14:
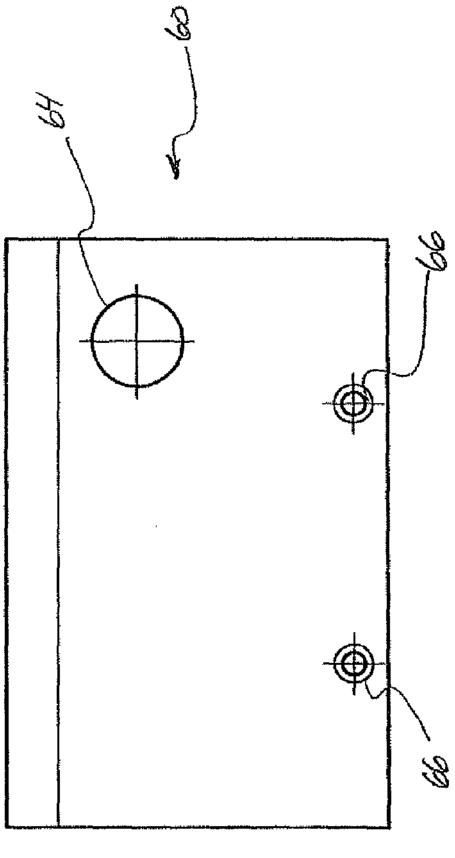
FIG. 14 is a top view of the top plate shown in FIG. 13.
Figure 18:
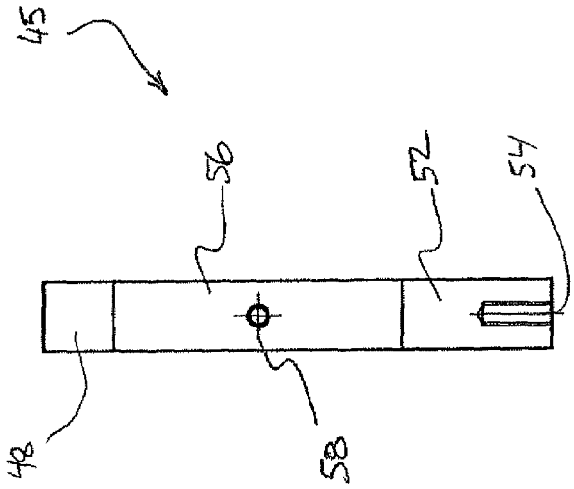
FIG. 18 is a front view of the C-shaped bracket shown in FIG. 16.
Figure 16:
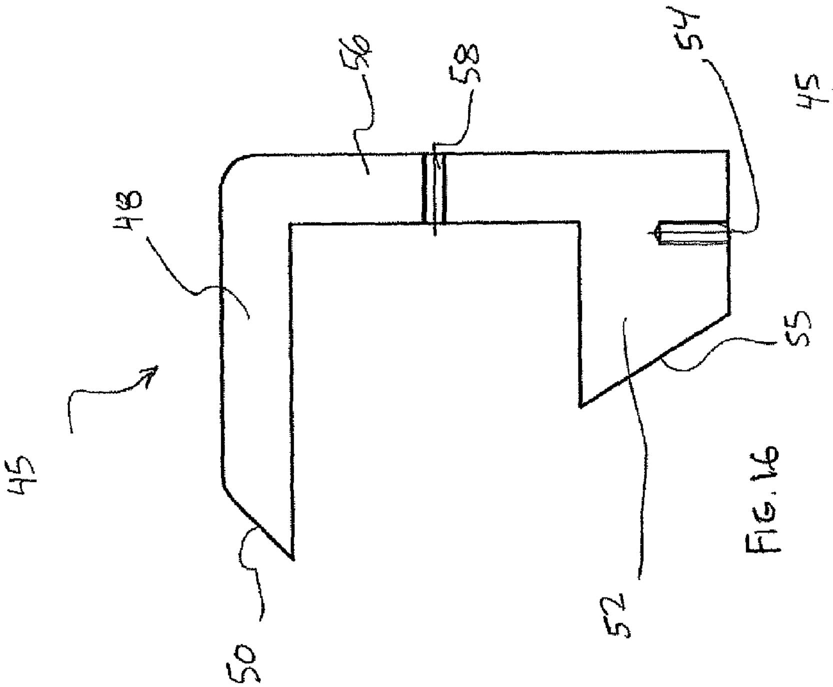
FIG. 16 is a side view of a C-shaped bracket according to one embodiment.
Figure 17:
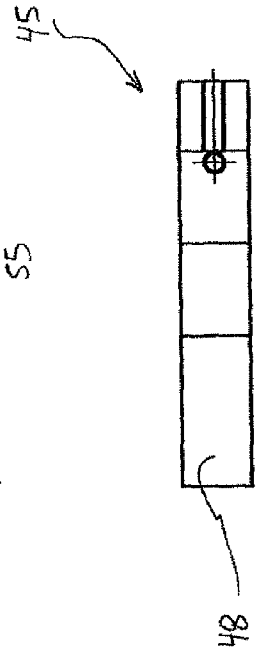
FIG. 17 is a top view of the C-shaped bracket shown in FIG. 16.
Figure 21:
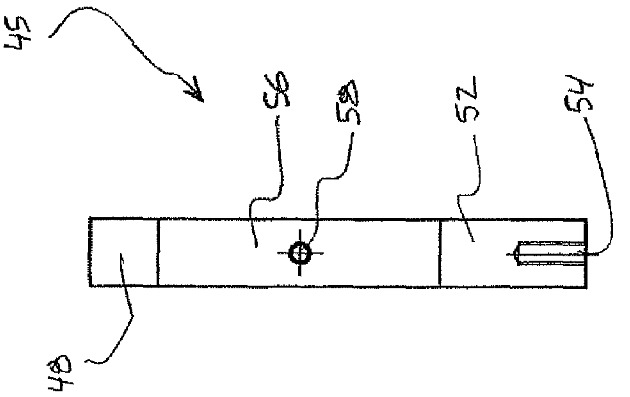
FIG. 21 is a front view of the C-shaped bracket shown in FIG. 19.
Figure 19:
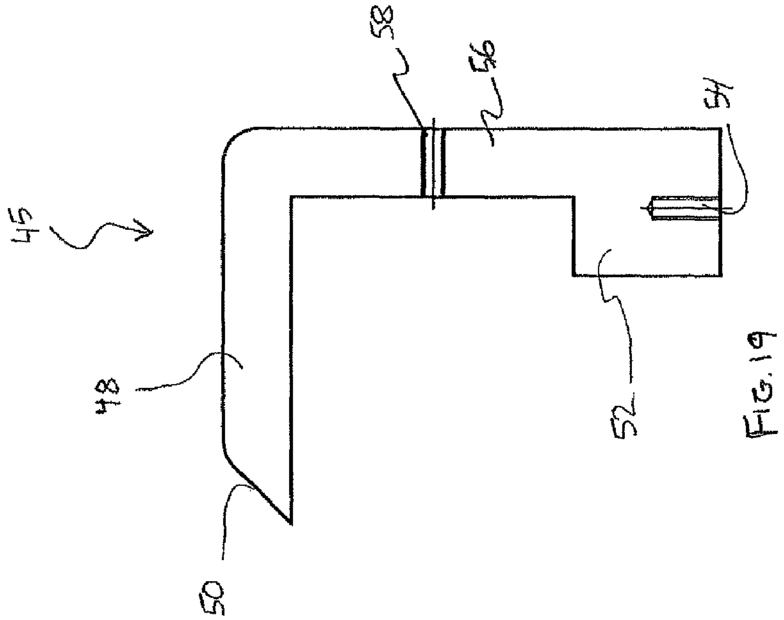
FIG. 19 is a side view of a C-shaped bracket according to a further embodiment.
Figure 20:
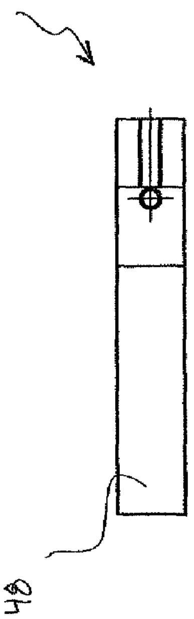
FIG. 20 is a top view of the C-shaped bracket shown in FIG. 19.

Referring to FIGS. 13-15, the top plate 60 is generally rectangular in shape including an angled forwardly extending area 62, a pin member receiving opening 64, and openings 66 for securing the top plate 60 to the back plate 70. As shown in FIG. 15, the pin member receiving opening 64 only extends a portion of the way through the top plate 60. The top plate 60 may be constructed of steel although any other suitable material may be used.

Referring to FIGS. 16-21, each of the C-shaped brackets 45 include an upper extending portion 48, a lower base portion 52, and an intermediate portion 56 positioned between the upper extending portion 48 and the lower base portion 52. The upper extending portion 48 includes an angled forwardly extending area 50 generally corresponding in angle to the angled forwardly extending area 62 of the top plate 60. The lower base portion 52 has an opening 54 for securing the C-shaped bracket 45 to the bottom plate 90. The intermediate portion 56 has an opening 58 for securing the C-shaped bracket 45 to the back plate 70. As shown in FIGS. 1-4 and 16-18, two of the C-shaped brackets 45 have an angled face 55 extending outward from the intermediate portion 56. The C-shaped brackets 45 may be constructed of steel although any other suitable material may be used.

Figure 24:
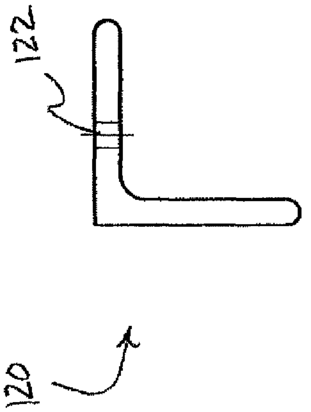
FIG. 24 is a top view of an angle member according to one embodiment.
Figure 25:
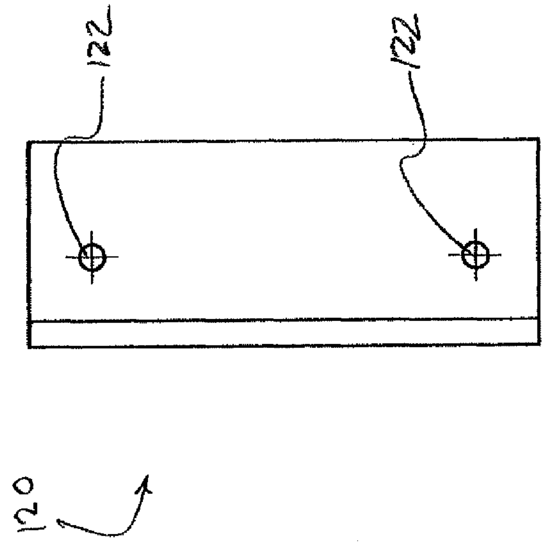
FIG. 25 is a front view of the angle member shown in FIG. 24.
Figure 22:
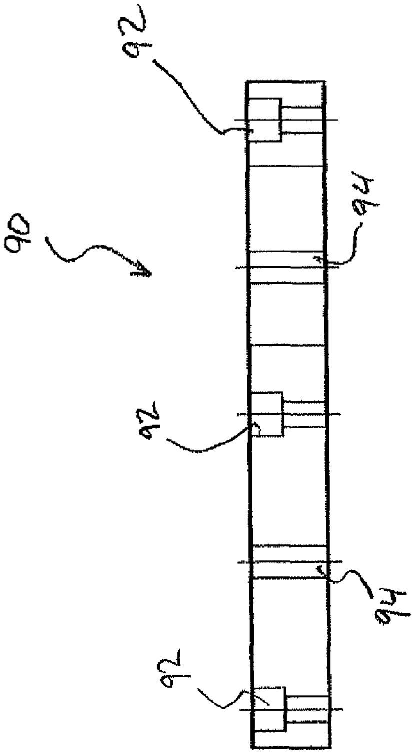
FIG. 22 is a front view of a bottom plate according to one embodiment.
Figure 23:
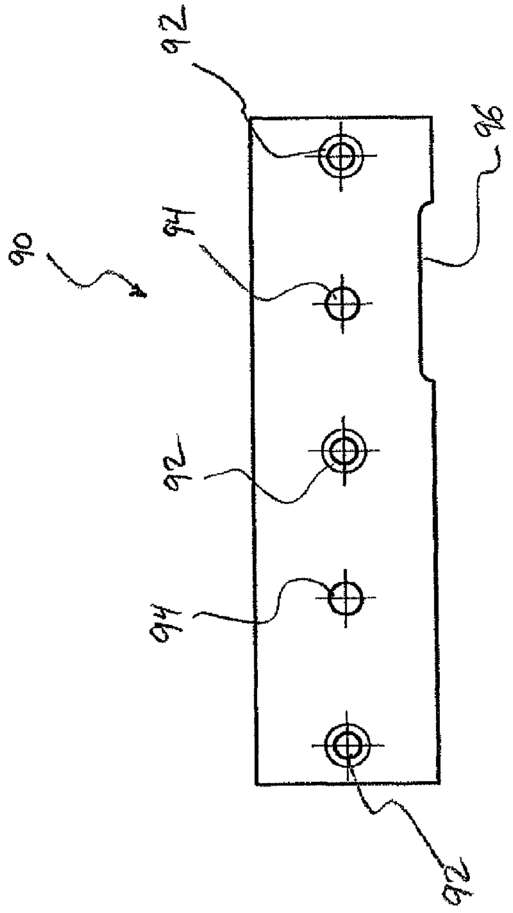
FIG. 23 is a top view of the bottom plate shown in FIG. 22.

Referring to FIGS. 22-23, the bottom plate 90 is generally rectangular in shape and includes three openings 92 for securing the C-shaped brackets 45 to the bottom plate 90 and two openings 94 for securing the bottom plate 90 to the base 20. The bottom plate 90 further includes a recessed area 96 for receiving a portion of the guard 110. Referring to FIGS. 24 and 25, the angle member 120 is generally L-shaped and includes openings 122 for securing the angle member 120 to the front surface 26 of the base 20. The bottom plate 90 may be constructed of steel although any other suitable material may be used.

Figure 29:
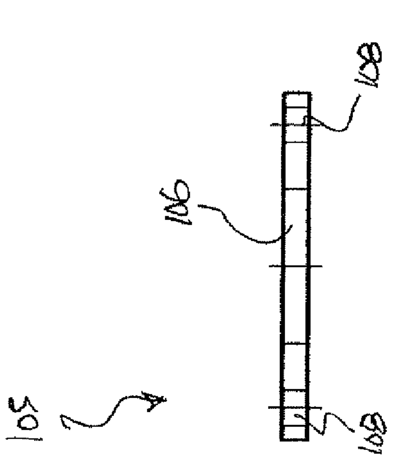
FIG. 29 is a side view of a spacer according to one embodiment.
Figure 30:
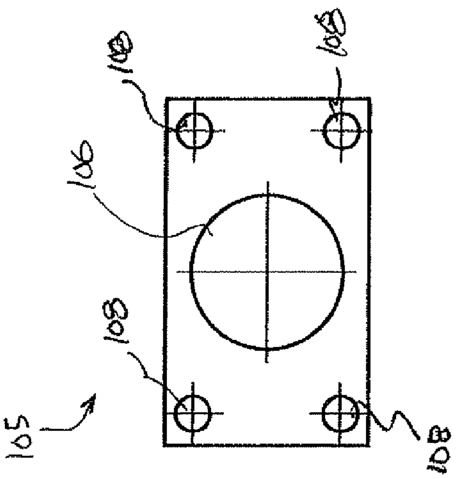
FIG. 30 is a top view of the spacer shown in FIG. 29.
Figure 28:
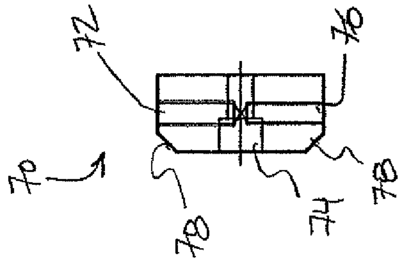
FIG. 28 is a side view of the back plate shown in FIG. 26.
Figure 26:
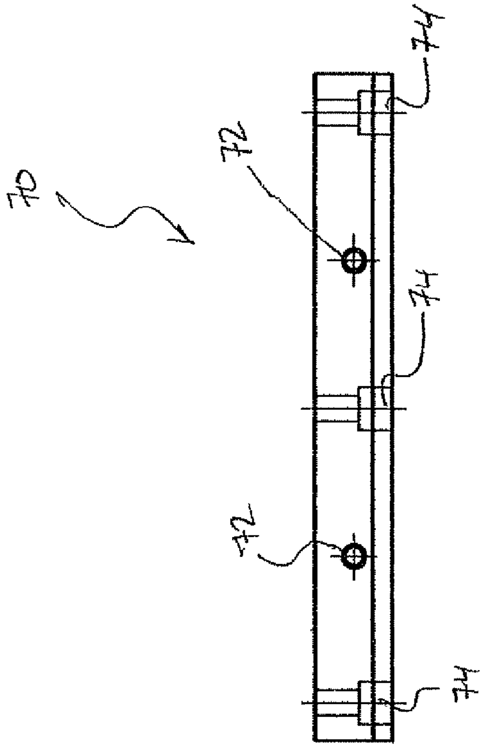
FIG. 26 is a top view of a back plate according to one embodiment.
Figure 27:
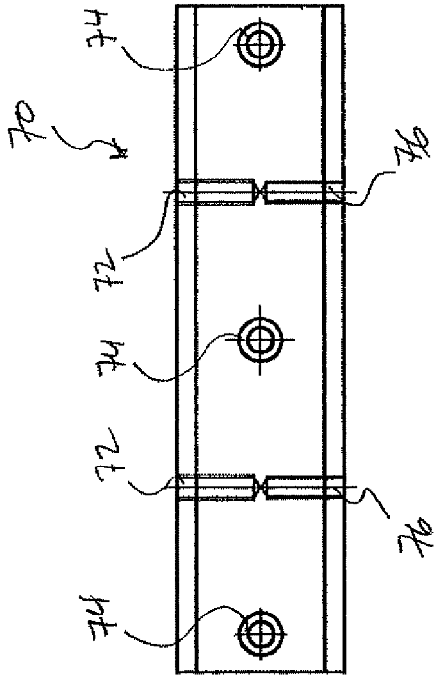
FIG. 27 is a front view of the back plate shown in FIG. 26.

Referring to FIGS. 26-28, the back plate 70 is generally rectangular in shape and includes two openings 72 for securing the back plate 70 to the top plate 60, three openings 74 for securing the back plate 70 to the C-shaped brackets 45, and two openings 76 for securing the back plate 70 to the mounting plate 80. The back plate 70 further includes beveled portions 78 on an outer surface of the back plate 70. Referring to FIGS. 29 and 30, the spacer 105 is generally rectangular in shape and defines a central bore 106 for receiving the collar portion of the cylinder device 102 therethrough. The spacer 105 also includes four openings 108 for securing the spacer 105 between the mounting plate 80 and the cylinder 102. The back plate 70 may be constructed of steel or a polymeric material, such as rubber, or a combination thereof, although any other suitable material may be used.

Figure 33:
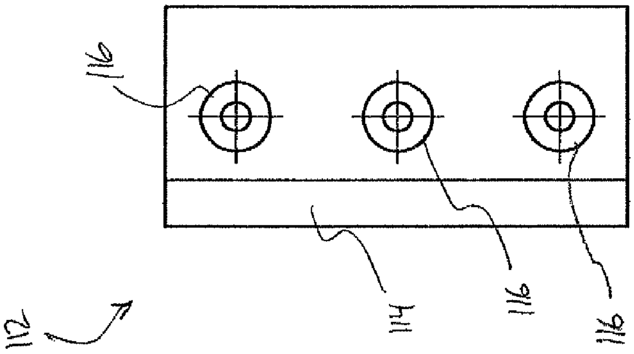
FIG. 33 is a front view of an additional wear plate according to one embodiment.
Figure 34:
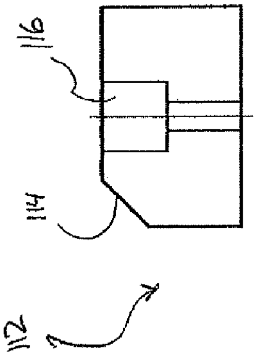
FIG. 34 is a bottom view of the additional wear plate shown in FIG. 33.
Figure 32:
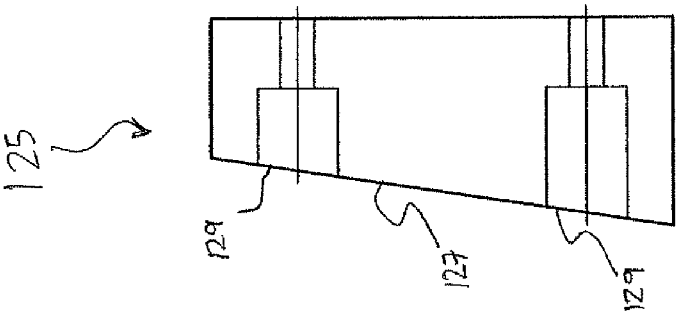
FIG. 32 is a side view of the wear plate shown in FIG. 31.
Figure 31:
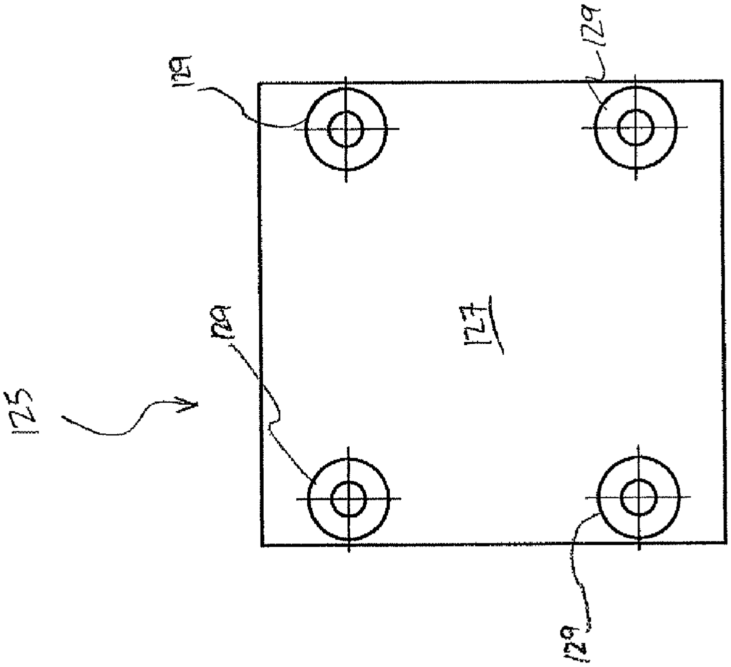
FIG. 31 is a front view of a wear plate according to one embodiment.

Referring to FIGS. 31 and 32, the wear plate 125 is generally trapezoidal in shape and includes an angled outwardly facing surface 127 and four openings 129 for securing the wear plate 125 to the front surface 26 of the base 20. The angled outwardly facing surface 127 may generally correspond to the angle of the rear surface of a rear load collection container. Referring to FIGS. 33 and 34, an additional wear plate 112 is provided on the guard 110 and includes an angled surface 114 and three openings 116 for securing the additional wear plate 112 to the guard 110. The wear plates 112, 125 may be constructed of a polymeric material, such as rubber, although any other suitable material may be used.

Figure 4:
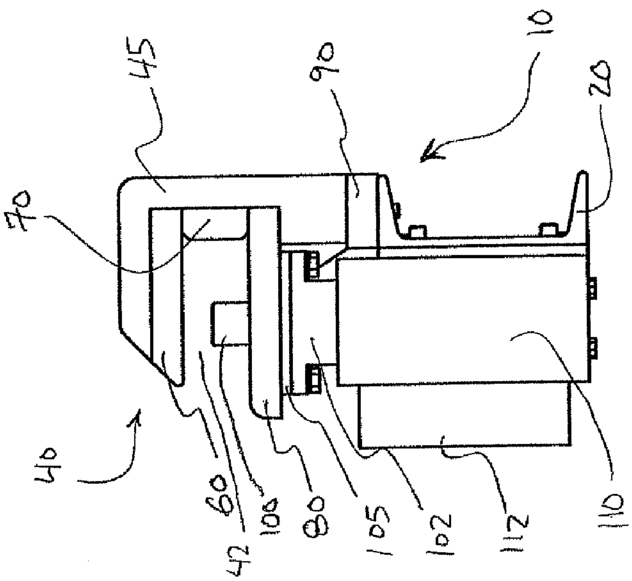
FIG. 4 is a side view of the retro-fit lift device shown in FIG. 1.
Figure 2:
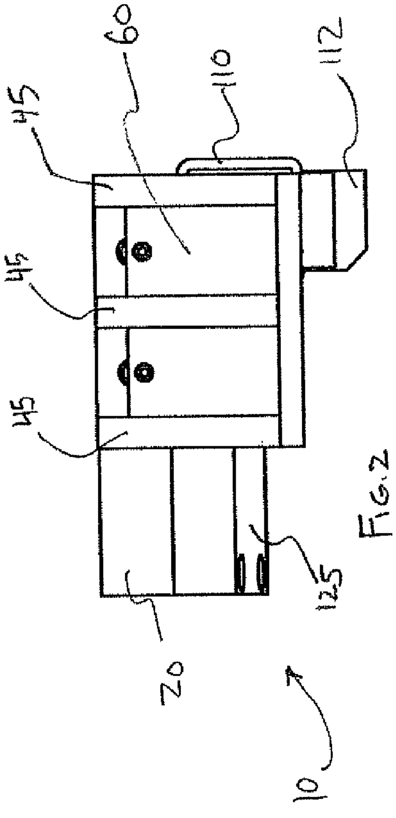
FIG. 2 is a top view of the retro-fit lift device shown in FIG. 1.
Figure 3:
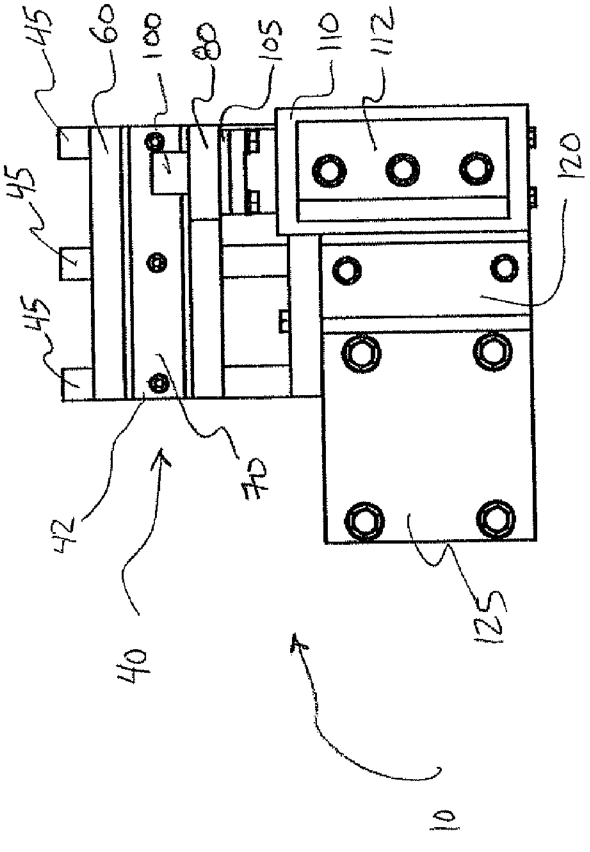
FIG. 3 is a front view of the retro-fit lift device shown in FIG. 1.

Referring again to FIGS. 1-4, three C-shaped brackets 45 are attached to the bottom plate 90 and the bottom plate is secured to the base 20. Although three C-shaped brackets 45 are shown in FIGS. 1-4, any number of brackets 45 may be provided. The top plate 60 is connected to the upper extending portion 48 of the C-shaped bracket 45 and the back plate 70 is connected to the intermediate portion 56 of the C-shaped bracket 45. The mounting plate 80 is connected to the lower base portion 52 of the C-shaped bracket 45 with the cylinder 102 being aligned with the cylinder collar receiving portion 82. The mounting plate 80 is also secured to the back plate 70. The cylinder device 102 is secured to the underside of the mounting plate 80 with the spacer 105 positioned therebetween. The guard 110 encloses at least a portion of the cylinder device 102 and is secured to the front surface 26 of the base 20 via the angle member 120. The angle member 120 may be secured to the guard 110 by using fasteners, such as screws or bolts, welding, or any other suitable arrangement. The additional wear plate 112 is provided on a rear facing surface of the guard 110. The wear plate 125 is provided on the front surface 26 of the base 20. As shown in FIG. 4, the channel 42 defined by the trunnion receiving portion 40 extends between the top plate 60 and the mounting plate 80.

Figure 5:
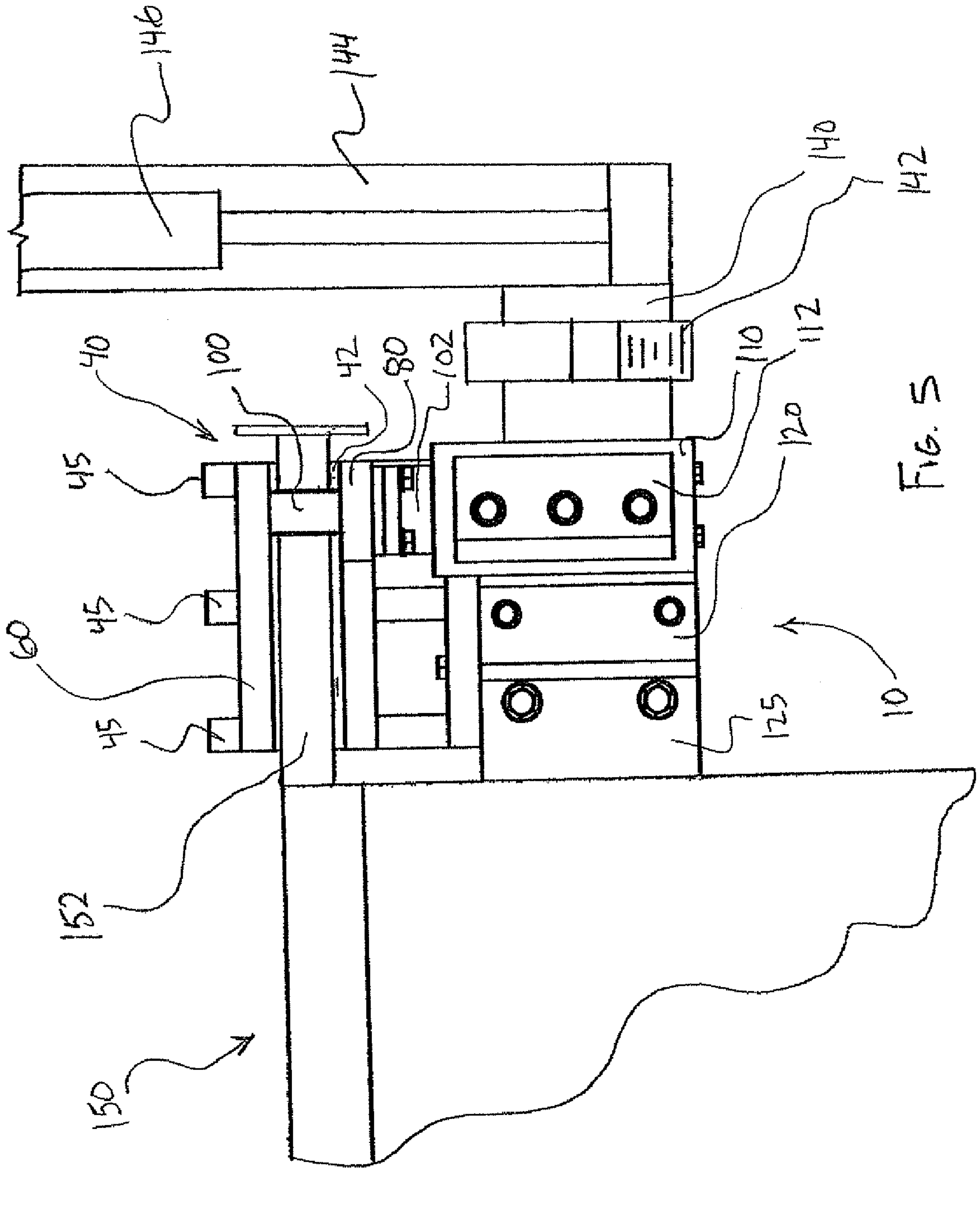
FIG. 5 is a front view of the retro-fit lift device shown in FIG. 1, showing the device secured to cross-beam of front load refuse collection vehicle with a pin member extended.
Figure 6:
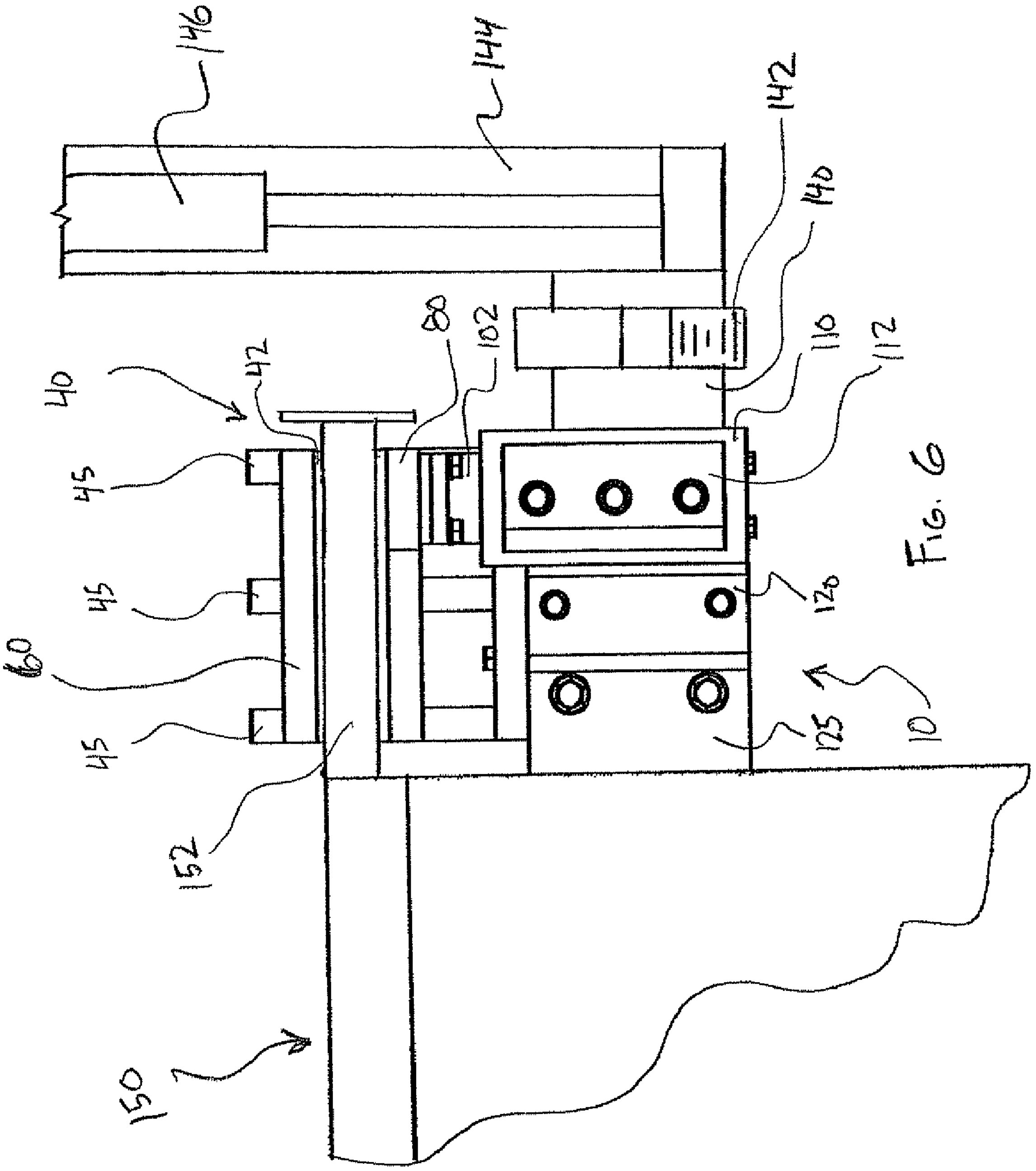
FIG. 6 is a front view of the retro-fit lift device shown in FIG. 1, showing the device secured to cross-beam of front load refuse collection vehicle with a pin member retracted.

Referring to FIGS. 5 and 6, the retro-fit lift device 10 is shown attached to a cross-beam 140 of a front load refuse collection vehicle. The retro-fit lift device 10 may be secured to the cross-beam by welding the base 20 to the cross-beam 140, although the base 20 may be secured to the cross-beam 140 by other suitable fastening arrangements. For example, the base 20 may be bolted to the cross-beam 140. Further, although the retrofit device 10 is secured to the cross-beam 140 such that there is a space between the device 10 and the fork 142, the device 10 may be positioned adjacent the fork 142 to that the device 10 abuts the fork 142. Attached to the cross-beam 140 is a fork 142 for engaging and lifting a front load collection container (not shown) and an arm 144 and hydraulic cylinder 146 for lifting and pivoting the fork 142 and cross-beam 140, which are typically provided on front load refuse collection vehicles. Further, a rear load collection container 150 having a trunnion 152 is also provided.

The pin member 100 has an extended position, as shown in FIG. 5, and a retracted position, as shown in FIG. 6. In the extended position, the pin member 100 extends into the channel 42 defined by the trunnion receiving portion 40. In particular, the pin member 100 extends from the mounting plate 80 to the pin receiving opening 64 of the top plate 60. However, the pin member 100 may only extend a portion of the way into the channel 42 towards the top plate 60 such that the pin member prevents the trunnion 152 of the rear load collection container 150 from entering or leaving the channel 42. In the retracted position, the pin member 100 is retracted from the channel 42 such that the trunnion 152 of the rear load collection container 150 is free to enter and leave the channel 42. The pin member 100 is selectively actuated from the retracted position to the extended position via the cylinder device 102. The cylinder device 102 may be a pneumatically actuated cylinder, although other suitable actuation mechanisms may be used.

In order to pick up and empty the rear load collection container 150 with a front load refuse collection vehicle, the retro-fit device 10 is secured to the cross-beam 140 adjacent the fork 142. A further retro-fit device 10 may be secured on the opposite end of the cross-beam 140 adjacent the other fork (not shown) of the front load refuse collection vehicle and would operate in the same manner as described below. Accordingly, a pair of retro-fit lift devices 10 may be provided to engage the two trunnions 152 of the rear load collection container 150. The pin member 100 is moved into the retracted position, as shown in FIG. 6, such that the trunnion receiving portion 40 is able to receive the trunnion 152. The trunnion receiving portion 40 is then moved such that the trunnion 152 of the rear load collection container 150 is positioned within the channel 42 by, for example, driving the vehicle forward or moving the rear load collection container 150. The rear load collection container 150 may engage the wear plate 125 and the additional wear plate 112. The rear load collection container 150 may be positioned further to the right, as shown in FIGS. 4 & 5, towards the arm 144 so that a portion of the rear load collection container 150 is positioned beneath the top plate 60. Further, the trunnion 152 may engage the back plate 70. The pin member 100 is then moved into the extended position, as shown in FIG. 5, thereby securing the trunnion 152 within the channel 42. The rear load collection container 150 may then be lifted and pivoted by moving the cross-beam 140 upwardly by actuating the hydraulic cylinder 146. By lifting and turning the rear load collection container 150 upside down, the contents of the rear load collection container 150 may be emptied into the collection vehicle as generally known in the art. With the retro-fit lift device 10 secured to the cross-beam 140 of the front load refuse collection vehicle, the fork 142 may be used to pick up and empty a front load collection container (not shown) as generally known in the art. In particular, the retro-fit lift device 10 is positioned on the cross-beam such that the retro-fit lift device 10 does not interfere with the operation of the fork 142 to lift and empty the front load collection container.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A retro-fit lift device for a front load refuse collection vehicle comprising:

a base having a rear surface, the base configured to be secured to a cross-beam of the front load refuse collection vehicle;

a trunnion receiving portion defining a channel, the trunnion receiving portion being connected to the base; and a pin member movable between an extended position and a retracted position, wherein at least a portion of the pin member extends into the channel in the extended position, and wherein the trunnion receiving portion comprises a plurality of C-shaped brackets secured to the base, each of the C-shaped brackets having an upper extending portion, a lower base portion, and an intermediate portion extending between the upper extending portion and the lower base portion.

2. The retro-fit lift device of claim 1, wherein the channel is configured to receive a trunnion of a rear load collection container when the pin member is in the retracted position.

3. The retro-fit lift device of claim 1, further comprising a top plate secured to the upper extending portion of each C-shaped bracket, a back plate secured to the intermediate portion of each C-shaped bracket, and a mounting plate secured to the lower base portion of each C-shaped bracket.

4. The retro-fit lift device of claim 3, wherein the channel extends between the top plate and the mounting plate.

5. The retro-fit lift device of claim 4, wherein the pin member is removed from the channel in the retracted position.

6. The retro-fit lift device of claim 3, wherein the top plate has an angled forwardly extending area.

7. The retro-fit lift device of claim 1, wherein the base comprises a C-shaped channel member and the rear surface of the base is an open portion of the C-shaped channel member.

8. The retro-fit lift device of claim 1, further comprising a wear plate connected to a front surface of the base.

9. The retro-fit lift device of claim 8, wherein the wear plate is constructed of a polymeric material.

10. The retro-fit lift device of claim 8, wherein the wear plate has an angled front surface.

11. The retro-fit lift device of claim 1, wherein the pin member is selectively actuated from the retracted position to the extended position via a cylinder device.

12. The retro-fit lift device of claim 11, wherein the cylinder device comprises a pneumatically actuated cylinder.

13. A retro-fit lift device for a front load refuse collection vehicle comprising:

a base having a rear surface, the base configured to be secured to a cross-beam of the front load refuse collection vehicle;

a trunnion receiving portion defining a channel, the trunnion receiving portion being connected to the base; and a pin member movable between an extended position and a retracted position, the pin member is selectively actuated from the retracted position to the extended position via a pneumatically actuated cylinder, wherein at least a portion of the pin member extends into the channel in the extended position, and wherein the pneumatically actuated cylinder is at least partially enclosed by a guard.

14. The retro-fit lift device of claim 13, wherein the pneumatically actuated air cylinder is secured to a front surface of the base.

15. A method of picking up a rear load collection container having a trunnion with a front load refuse collection vehicle comprising:

providing at least one retro-fit lift device on a cross-beam of the front load refuse collection vehicle, each retro-fit lift device comprising:

a base having a rear surface;

a trunnion receiving portion defining a channel, the trunnion receiving portion being connected to the base; and a pin member movable between an extended position and a retracted position;

moving the pin member into the retracted position;

moving the trunnion receiving portion such that the trunnion of the rear load collection container is positioned within the channel; and moving the pin member into the extended position thereby securing the trunnion within the channel.

16. The method of claim 15, further comprising: lifting the rear load collection container by moving the cross-member of the front load collection vehicle upwardly.

17. The method of claim 15, wherein the pin member is actuated from the retracted position to the extended position via a pneumatically actuated air cylinder.

18. The method of claim 17, further comprising a wear plate connected to a front surface of the base.

19. The method of claim 18, further comprising: engaging the rear load collection container with the wear plate.

* * * * *

UNITED STATES PATENT AND TRADEMARK OFFICE

CERTIFICATE OF CORRECTION

| | | |
|---|---|---|
| PATENT NO. | : | 8,388,036 B2 |
| APPLICATION NO. | : | 12/808271 |
| DATED | : | March 5, 2013 |
| INVENTOR(S) | : | John Townsend |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this

First Day of September, 2015

Michelle K. Lee

*Director of the United States Patent and Trademark Office*